(12) United States Patent
Struyf et al.

(10) Patent No.: US 8,574,348 B2
(45) Date of Patent: Nov. 5, 2013

(54) PROCESS FOR PURIFYING A GAS IN A TEMPERATURE SWING ADSORPTION UNIT

(75) Inventors: Steven S. M. Struyf, Dubai (AE); William C. Rooney, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 15 days.

(21) Appl. No.: 13/372,682

(22) Filed: Feb. 14, 2012

(65) Prior Publication Data
US 2012/0247331 A1    Oct. 4, 2012

Related U.S. Application Data

(60) Provisional application No. 61/470,188, filed on Mar. 31, 2011.

(51) Int. Cl.
*B01D 53/047* (2006.01)
*C10L 3/10* (2006.01)

(52) U.S. Cl.
USPC ..................... 95/96; 95/97; 95/106

(58) Field of Classification Search
USPC ................. 95/96, 97, 104, 106, 148
See application file for complete search history.

(56) References Cited

U.S. PATENT DOCUMENTS

| | | | | |
|---|---|---|---|---|
| 4,077,779 A * | 3/1978 | Sircar et al. | | 95/26 |
| 4,359,328 A * | 11/1982 | Wilson | | 95/98 |
| 4,472,178 A | 9/1984 | Kumar et al. | | |
| 5,089,034 A | 2/1992 | Markovs et al. | | |
| 5,486,227 A | 1/1996 | Kumar et al. | | |
| 5,614,000 A * | 3/1997 | Kalbassi et al. | | 95/96 |
| 5,846,295 A * | 12/1998 | Kalbassi et al. | | 95/105 |
| 5,914,455 A | 6/1999 | Jain et al. | | |
| 6,083,299 A * | 7/2000 | Kapoor et al. | | 95/100 |
| 6,113,672 A * | 9/2000 | Kapoor et al. | | 95/101 |
| 2003/0037672 A1 * | 2/2003 | Sircar | | 95/96 |

* cited by examiner

*Primary Examiner* — Frank Lawrence, Jr.
(74) *Attorney, Agent, or Firm* — Mark Goldberg

(57) ABSTRACT

A temperature swing adsorption process to purify a gas comprising at least one adsorption step and at least one regeneration step wherein the regeneration step takes place at a lower pressure than the adsorption step. The pressure is increased by a repressurization step between the regeneration step and the adsorption step, and then a purge step takes place after said repressurization step.

7 Claims, 4 Drawing Sheets

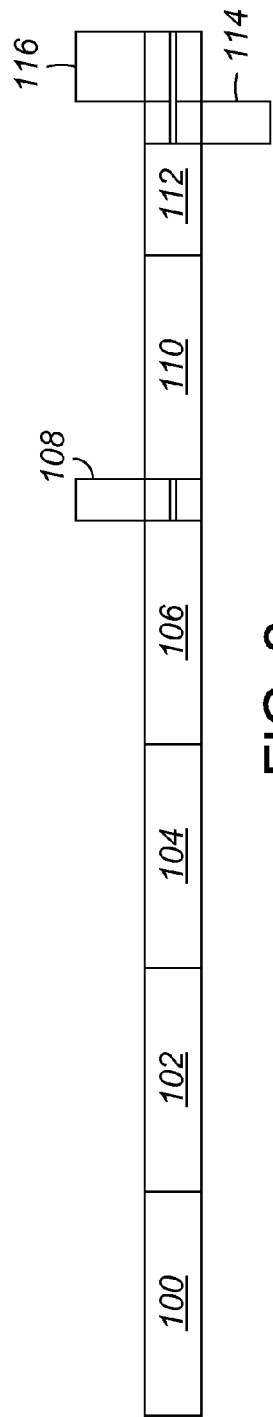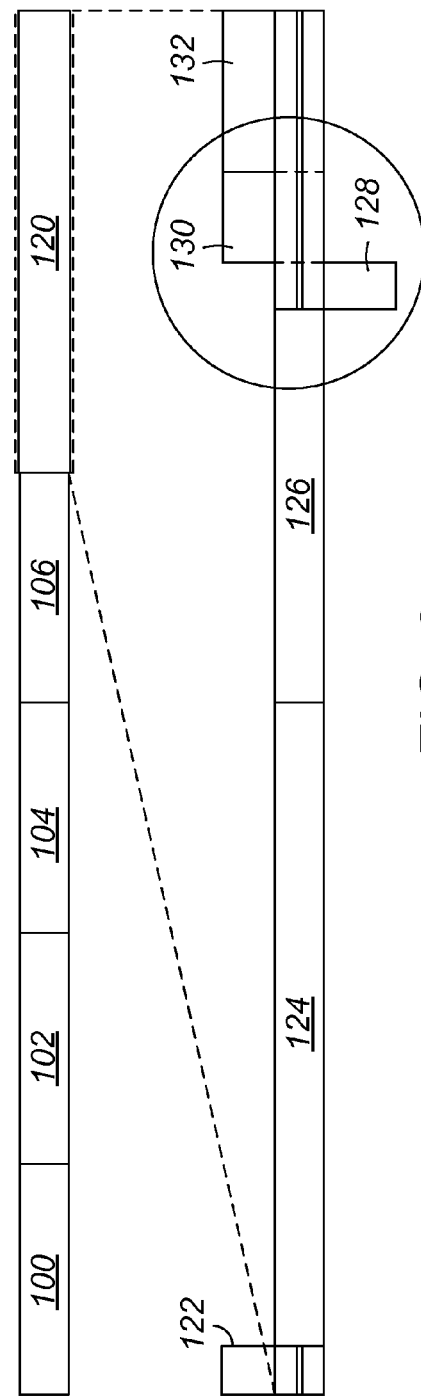

PROCESS FOR PURIFYING A GAS IN A TEMPERATURE SWING ADSORPTION UNIT

CROSS-REFERENCE TO RELATED APPLICATION

This application claims priority from Provisional Application No. 61/470,188 filed Mar. 31, 2011, the contents of which are hereby incorporated by reference.

BACKGROUND OF THE INVENTION

Temperature swing adsorption molecular sieve units are used in a variety of industries to remove contaminants from liquids and gas streams. This is a batch-wise process consisting of two basic steps which are adsorption and regeneration. In the adsorption step, contaminants are removed by being adsorbed on the solid molecular sieve material and then the treated stream leaves the unit with contaminant levels below the required specification limit or further treatment is necessary. In the regeneration step, contaminants are desorbed from the solid molecular sieve material by means of a regeneration stream (typically gas).

The regeneration step consists of two major parts—heating and cooling. In the heating part of the process, the regeneration stream, which is contaminant free, is heated to an elevated temperature (290° C. in one embodiment of the invention) and flows over the molecular sieve material. Due to the heat of the gas, mainly used as heat of desorption, and the difference in partial pressure of the contaminants on the molecular sieve material and in the regeneration gas stream, the contaminants desorb from the solid material and leave the unit with the regeneration gas. A cooling step is then necessary. As a result of the heating step the molecular sieve material heats up. To prepare the material again for the next adsorption step and since adsorption is favored at lower temperatures than desorption, the molecular sieve material needs to be cooled by means of a stream typically flowing over the molecular sieve at a temperature very close to the feed stream temperature.

Hence, the most basic form of temperature swing molecular sieve process unit consists of two vessels with one vessel in adsorption mode and the other vessel in regeneration mode. However, dependant on the amount of the feed stream to be treated as well the amount of contaminants to be removed from the feed stream, several vessels, which operate in a parallel mode, could be required. In a more complicated form of operation, the regeneration step can also be split over two vessels in a series-heat-and-cool cycle, where one of the vessels would be in the heating step and another would be in the cooling step.

Apart from the basic adsorption and regeneration steps described above, additional steps may need to be included dependent on the pressure levels of the feed stream versus the regenerant stream. For instance, if adsorption is carried out at a higher pressure than regeneration (note that a lower pressure will favour desorption of contaminants from the molecular sieve material), at a minimum, two additional steps are required: a depressurization step where the pressure is reduced from adsorption pressure to the regeneration pressure; and a repressurization where the pressure is increased from the regeneration pressure to adsorption pressure. Note that sometimes the opposite is true, with regeneration carried out at a higher pressure than adsorption, but in this case again a depressurization and repressurization step need to be included. If depressurization and repressurization steps are present they are typically part of the regeneration cycle.

All of the above steps are typically programmed into a so-called "switching sequence", either in a Programmable Logic Controller (PLC) or Distributed Control System (DCS) to allow this in essence batch-process to work as a semi-continuous process.

BRIEF DESCRIPTION OF THE DRAWINGS

FIG. 2 shows a typical molecular sieve unit switching sequence for a system with 4 beds in parallel adsorption.

FIG. 3 shows the incorporation of a purge gas step in the switching sequence with the purge step executed after the repressurization step.

DETAILED DESCRIPTION OF THE INVENTION

Figure 1:
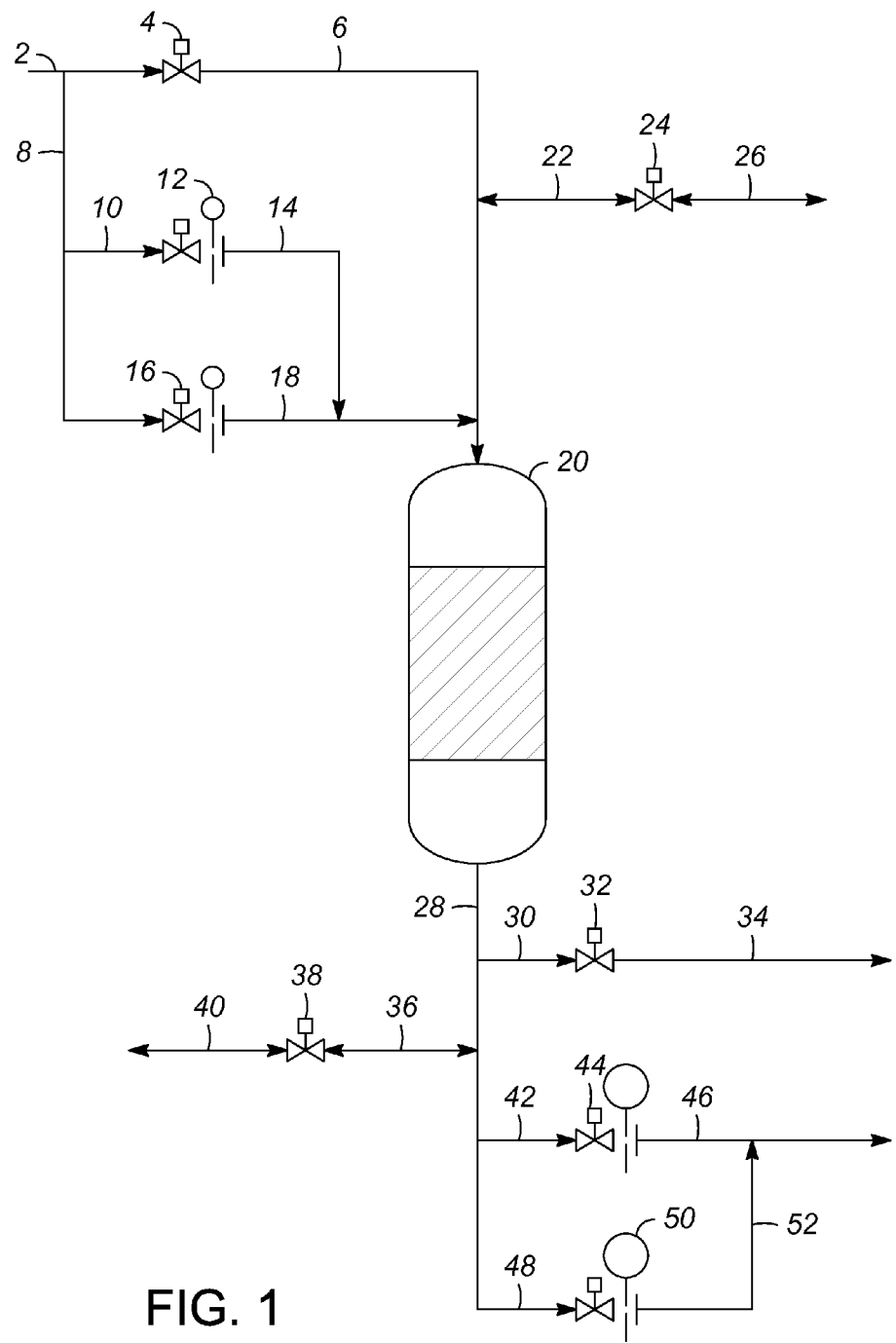
FIG. 1 shows a typical set-up of a molecular sieve process unit adsorber vessel and its associated valves.

In natural gas plants, for instance for Natural Gas Liquids (NGL) recovery or methane liquefaction (LNG), temperature swing adsorption molecular sieve processes are used to remove water and sulphur compounds from the natural gas so that the gas can be fed to the cryogenic NGL recovery or liquefaction section of the plant. The regenerant that is used is typically lean methane rich treated gas from downstream of the NGL Recovery unit in NGL recovery type facilities or nitrogen rich end flash gas/boil-off gas in LNG facilities.

The valve switching sequence in a typical system as shown in FIG. 2 inherently causes some operational disturbances on the downstream cryogenic units (NGL Recovery Process or LNG Liquefaction). Typically, the heating and cooling steps use a regeneration gas with significantly different composition from the actual feed gas stream. Either the regeneration gas stream is lean in the heavier hydrocarbon components ($C_{2+}$) or is rich in nitrogen (for instance for LNG facilities). In the case of a nitrogen-rich gas, after finishing the cooling, the vessel is filled with a significant amount of nitrogen, which, once the bed goes back into its adsorption step, will end up in the treated product gas from the unit and will be sent to the downstream cryogenic units. These cryogenic processes are typically very sensitive to a change in feed gas nitrogen content as it results in temperature and pressure fluctuations on units' exchangers and compressors. This could lead eventually to thermal stress fatigue (and eventually, failure). It is further known that molecular sieve products have a certain adsorption capacity for the hydrocarbons in the feed gas stream. During regeneration, these hydrocarbons are driven off of the material such that once an adsorber vessel comes back into its adsorption step, for a certain amount of time, hydrocarbon species adsorb on the molecular sieve material up to the point where the adsorption for a specific component reaches its saturation level. For some time this causes operational disturbances, i.e. not meeting product recoveries for specific hydrocarbon components, in for instance an NGL Recovery process. The duration of this disturbance is dependent on a number of factors, including but not limited to the amount and type of adsorbent loaded in the adsorber, the feed gas hydrocarbon speciation and feed gas flow through the adsorber in the adsorption step.

When repressurizing an adsorber vessel to prepare it to go into its adsorption step, the gas in the vessel heats up due to the adiabatic compression effect. The temperature increase of the gas in the vessel is more outspoken for adsorber vessels that are internally lined with refractory as there is even less chance for the heat to dissipate out of the vessel through the metal vessel shell compared to an externally insulated vessel. Thus once this adsorber vessel comes into adsorption, the heat will be purged out of the vessel with the product gas causing a sudden temperature increase on the product gas to the downstream cryogenic systems, again leading to operational upsets in the unit and thermal stress on some of the equipments installed in these units. The magnitude of these effects on the downstream systems depends also on the number of beds that are in parallel adsorption as eventually the product gas coming from the bed that just moved to its adsorption step is mixed with product gas from vessels that have been on adsorption already for a certain period of time and for which these initial effects are no longer present. In essence this attenuates some of the disturbances.

This purge step can be executed in two ways: through the depressurization valves or through a dedicated purge flow valve and restriction orifice. The purge step is generally through the depressurization valves which are typically already included in molecular sieve applications. Executing the purge step after the repressurization step, i.e. at high adsorption pressure, allows for a greater flow through the restriction orifices downstream the depressurization valves than executing it before repressurization step, at low regeneration gas pressure, as the high pressure case is the design point for the depressurization restriction orifices. This eventually would lead to a better purge operation. The purge can also be through a dedicated purge flow valve and restriction orifice. Although this would add extra piping and equipment to the unit, the capital expense implication is considered to be minimal (see FIG. 4). Further this approach allows designing the restriction orifice and sequence purge time for the optimal purge flow requirement. In order to avoid the vessel from depressurizing during the purge step resulting in an additional, although likely only very short, repressurization step after the purging, the purge gas needs to be supplied through the main feed gas valve.

The main advantages for this purge are removal of nitrogen from the vessel before it moves to its adsorption step, preloading of the molecular sieve material with key hydrocarbon components before the adsorber vessel moves to its adsorption step and removal of the adiabatic compression heat from the vessel before it moves to its adsorption step.

Overall the advantage will be that pressure, temperature and compositional fluctuations on the downstream cryogenic units can be avoided, resulting in more stable operation of the NGL recovery and LNG liquefaction processes with respect to meeting hydrocarbon product recovery specifications (resolved due to the hydrocarbon preloading), less thermal stress on the NGL recovery and LNG liquefaction processes equipment, resulting in a more reliable long-term operation (resolved due the combination of purging the adiabatic compression heat out of the system, and limiting the compositional—nitrogen and hydrocarbon—disturbances and less pressure fluctuations in the final stages of the LNG liquefaction process, which is typically the nitrogen rejection step (resolved due to purge of nitrogen out of the bed, which minimize the compositional nitrogen changes to the cryogenic units).

One skilled in the art would assess the amount of purge gas required to remove sufficient nitrogen from the vessel, preload the molecular sieve material sufficiently with key components and remove the heat from vessel to a level acceptable for minimal (i.e. no downstream unit effects).

Figure 5:
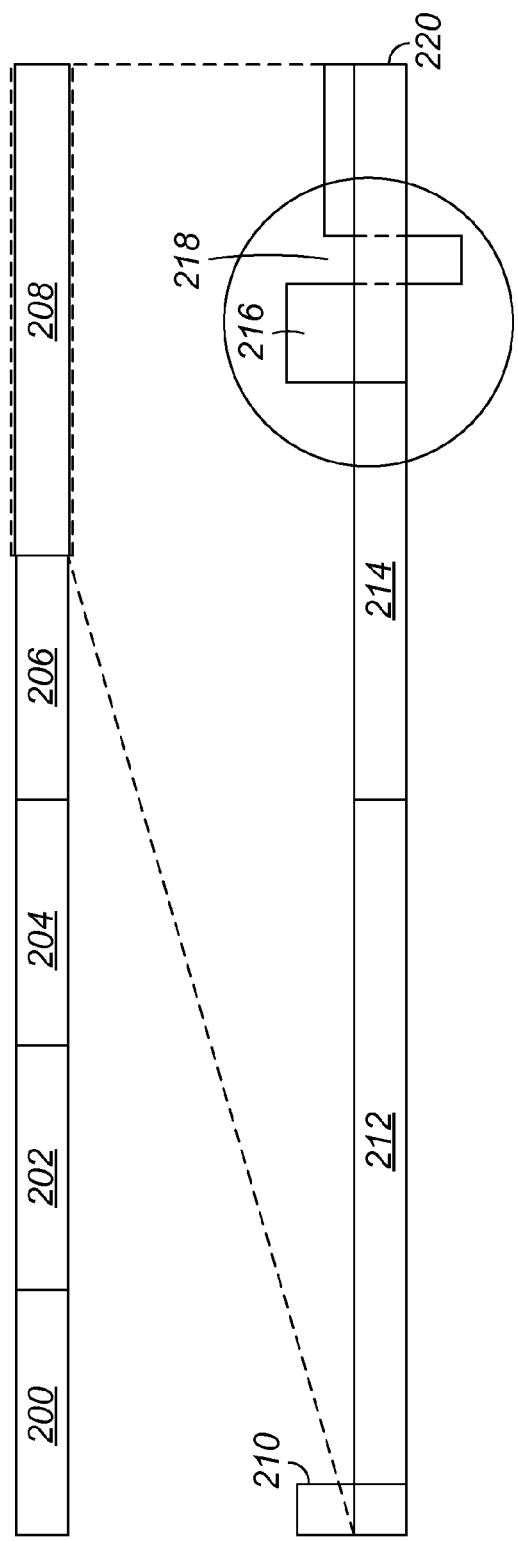
FIG. 5 shows the switching sequence with a purge step before repressurization.

While there have been some projects where a purge step has been employed, in all known cases this purge step is executed before the repressurization step, at the lower regeneration pressure, and not after the repressurization step, the latter being the subject of the present invention. The switching of the sequence of the purge step before the repressurization step in the sequence is shown in FIG. 5. The purge step is either executed with feed gas being supplied through the repressurization valves and the purge gas leaving through the depressurization valves or with lean methane rich gas supplied through the regeneration gas valve(s) installed at the top of the vessel and again purge gas leaving through the depressurization valves. In both cases, by design, purge gas flow is limited by the restriction orifices installed downstream the depressurization valves (see FIG. 1 for set up).

DETAILED DESCRIPTION OF THE DRAWINGS

FIG. 1 shows a typical set-up of a molecular sieve process unit adsorber vessel and its associated valves. A feed gas 2 is shown passing through feed gas inlet 4 and continuing in line 6 and continuing to adsorbent bed 20 where the gas is treated. A portion of the feed gas is shown passing through lines 8 and 10 to repressurization valves 12 and 16 and then to lines 14 and 18 to rejoin the feed gas in line 6. The treated gas 28 then proceeds to line 30 to product gas valve 32 and a product gas is shown exiting in line 34. There are provisions for the depressurization valves 44, 50 with a portion of gas 42, 48 shown passing through depressurization valves 44, 50 in lines 46, 52, respectively. Also shown are two regeneration heating and cooling valves for the adsorbent bed. A portion of gas 22 is shown passing through regeneration and heating valve 24 and passing into line 26 similarly regeneration heating and cooling valve 38 is shown with gas flow in line 36 and line 40 either entering or exiting the product gas stream. The system provides several options for a the regeneration gas. In one embodiment of the invention, a portion of product gas 36 is removed from the product gas stream and can be introduced at a point not shown into the adsorbent bed 20. Then following the regeneration a portion of the gas stream may be removed and introduced into line 26 for introduction into the gas stream six.

FIG. 2 shows a typical molecular sieve unit switching sequence free system with four beds in parallel adsorption. A first adsorber 100 is operated from 00:00 to 02:30, a second adsorber 102 from 02:30 to 05:00, a third adsorber 104 from 05:00 to 07:30, a fourth adsorber 106 from 07:30 to 10:00, depressurization zone 108 from 10:00 to 10:15, heating zone 110 from 10:15 to 12:30, cooling zone 112 from 12:30 to 13:55, repressurization zone 114 from 13:55 to 14:15 and standby and overall valve switching zone 116 from 14:15 to 15:00.

FIG. 3 shows the incorporation of a purge gas step in the switching sequence with the purge step executed after the repressurization step. A first adsorber 100 is operated from 00:00 to 02:30, a second adsorber 102 from 02:30 to 05:00, a third adsorber 104 from 05:00 to 07:30, a fourth adsorber 106 from 07:30 to 10:00, regeneration zone 120 from 10:00 to 15:00, depressurization zone 122 from 10:00 to 10:10, heating zone 124 from 10:10 to 12:30, cooling zone 126 from 12:30 to 13:55, repressurization zone 128 from 13:55 to 14:05, purge zone 130 from 14:05 to 14:25 and standby and overall valve switching zone 132 from 14:25 to 15:00.

Figure 4:
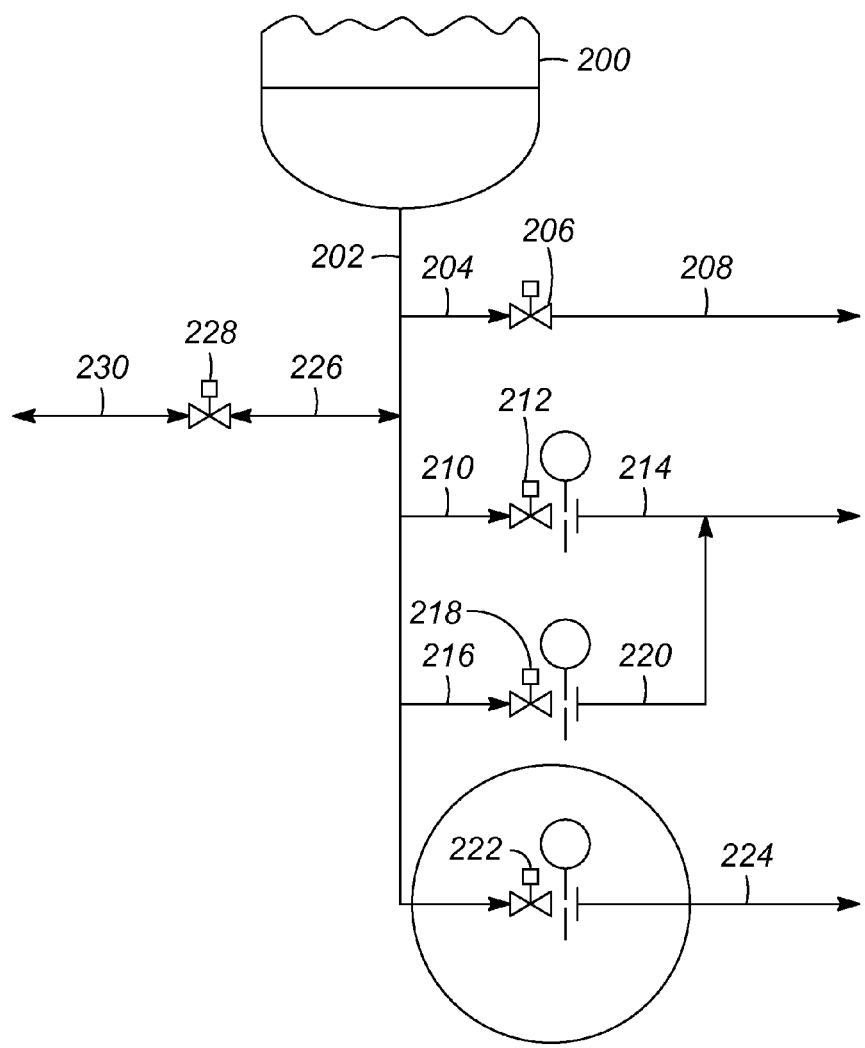
FIG. 4 shows the use of a dedicated purge valve and restriction orifice.

FIG. 4 shows the use of a dedicated purge valve and restriction orifice. A lower portion of adsorbent bed 200 is shown with product gas 202 exiting the adsorbent bed and passing into line 204 to product gas valve 206 into line 208. A portion of product gas 202 may go to either line 210 to depressurization valve 212 and then to line 214 or it may pass through line 216 to depressurization valve 218 into line 220 shown rejoining the gas in line 214. A purge out valve 222 is also shown in this figure with the gas exiting in line 224. A portion of the product gas may exit in line 226 through the regeneration heating and cooling valve 228 into line 230.

FIG. 5 shows the switching sequence with a purge step before repressurization. A first adsorber 200 is operated from 00:00 to 02:30, a second adsorber 202 from 02:30 to 05:00, a third adsorber 204 from 05:00 to 07:30, a fourth adsorber 206 from 07:30 to 10:00, regeneration zone 208 from 10:00 to 15:00, depressurization zone 210 from 10:00 to 10:10, heating zone 212 from 10:10 to 12:30, cooling zone 214 from 12:30 to 13:55, purge zone 216 from 13:55 to 14:15, repressurization zone 218 from 13:55 to 14:05 and standby and overall valve switching zone 220 from 14:25 to 15:00.

This invention is applicable in temperature swing adsorption applications in NGL recovery/sales gas complexes and LNG Facilities, where both the compositional effects (nitrogen/hydrocarbon adsorption) and the heat bump are typically present. It is also applicable for all temperature swing adsorption (molecular sieves and silica gel) applications where regeneration is performed at a lower pressure than the adsorption pressure. All of these applications will, to a certain extent which is dependent on the actual regeneration and adsorption pressure levels, experience the adiabatic heat rise during repressurization and thus the heat bump on the downstream systems when the freshly regenerated bed goes into its adsorption step. Compositional effects may not necessarily be present in these applications.

The invention claimed is:

1. A temperature swing adsorption process to purify a gas comprising at least one adsorption step and at least one regeneration step wherein said regeneration step takes place at a lower pressure than said adsorption step and wherein pressure is increased by a repressurization step between said regeneration step and said adsorption step, wherein a purge step takes place after said repressurization step;
   wherein said purge step reduces compositional, pressure and temperature fluctuations compared to a temperature swing adsorption system operating without said purge step;
   wherein the purge step is executed with a feed gas supplied through repressurization valves.

2. The temperature swing adsorption process of claim 1 wherein said gas comprises natural gas.

3. The temperature swing adsorption process of claim 1 wherein said purge step is conducted through a depressurization valve.

4. The temperature swing adsorption process of claim 1 wherein said purge step is through a dedicated purge flow valve and a restriction orifice.

5. The temperature swing adsorption process of claim 1 wherein said process is a part of a natural gas recovery process or a natural gas liquefaction process.

6. The temperature swing adsorption process of claim 1 wherein said purge step removes hydrocarbons or nitrogen.

7. The temperature swing adsorption process of claim 1 wherein said purge step results in a lower temperature when adsorption step starts.

* * * * *